Jan. 11, 1949.  E. N. EKLUND  2,458,840
GRINDING MACHINE
Filed Jan. 4, 1945  2 Sheets-Sheet 1
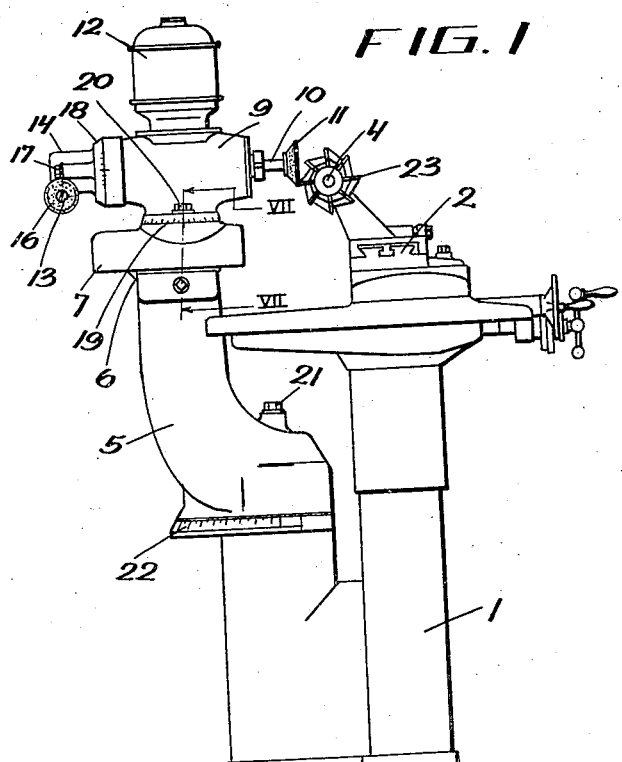
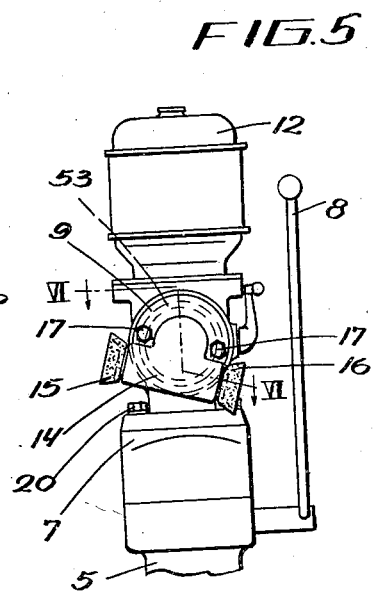
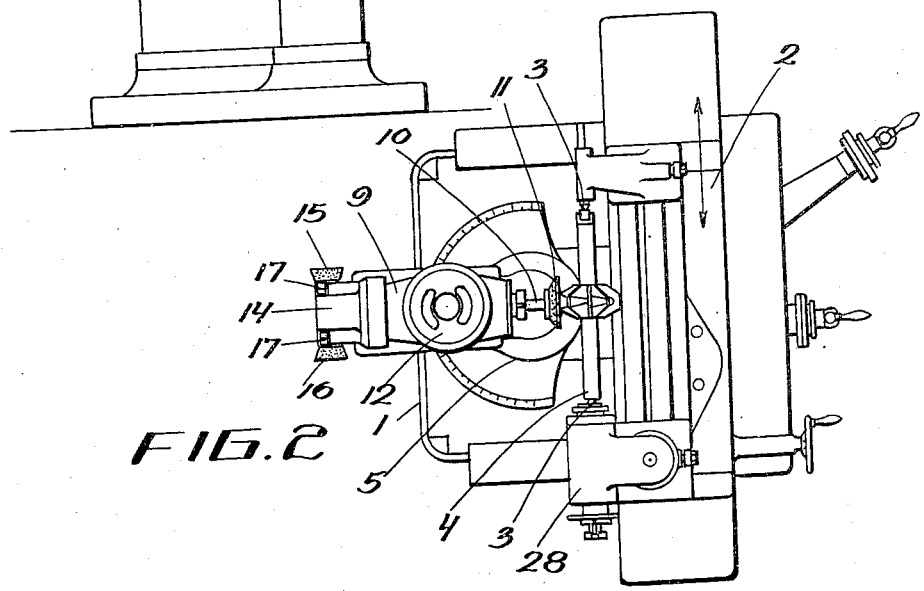
Inventor
Elias N. Eklund
By E. F. Wenderoth
Attorney Jan. 11, 1949.　　　　E. N. EKLUND　　　　2,458,840
GRINDING MACHINE
Filed Jan. 4, 1945　　　　　　　　　　2 Sheets-Sheet 2
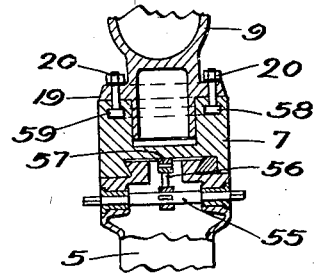
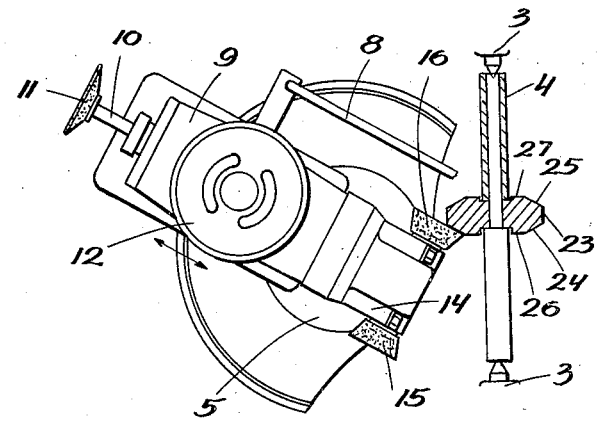
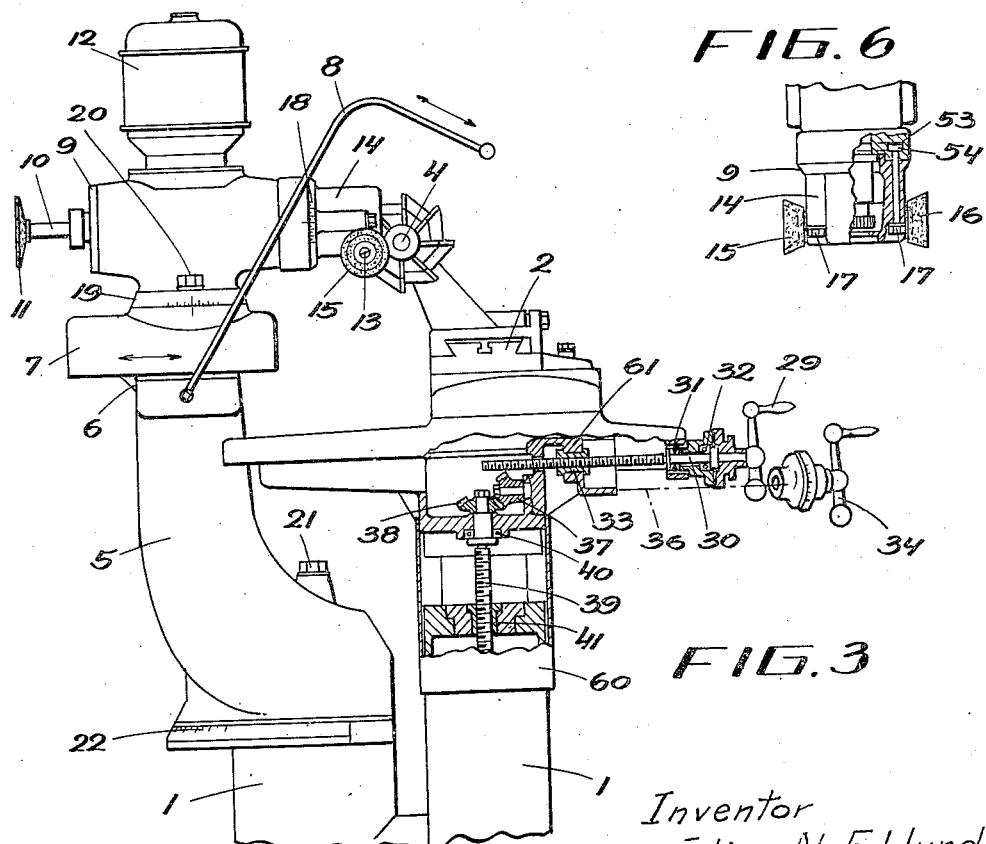
Inventor
Elias N. Eklund
By
E. F. Wenderoth
Attorney

Patented Jan. 11, 1949

2,458,840

UNITED STATES PATENT OFFICE

2,458,840

GRINDING MACHINE

Elias Napoleon Eklund, Stockholm, Sweden

Application January 4, 1945, Serial No. 571,295
In Sweden May 16, 1942

4 Claims. (Cl. 51—122)

The present invention refers to a new type of grinding machine, more particularly to a grind-machine tool for grinding milling cutters, reamers, and similar cutting tools.

It is a primary object of the present invention to provide a machine tool for grinding cutting tools of almost any form without removing the work from the arbor or chuck it is held by, before the grinding operation is finished.

This object is attained by the present invention by means of a machine tool provided with a slidable carriage supporting a rotatable headstock having two driven spindles for abrasive members, one of said spindles being horizontal, the other being adjustable to various inclines in a vertical plane perpendicular to the axis of the first-mentioned spindle.

Another object of the invention is to provide a machine tool having a slidable carriage supporting the headstock, the said carriage being adapted also for orbital movement in relation to the work.

Another object of the invention is to provide the aforesaid vertically adjustable spindle outside the one end of the headstock with two abrasive members, the other spindle being provided outside the other end of the headstock with a single abrasive member.

All these objects are attained by the present invention by which it is possible to grind cutting tools of almost any form without having to remove them from the initial position in which they are once set. The grinding machine according to the invention is provided in the usual way with a headstock mounted on a slidable carriage and adjustable to various rotational positions in a horizontal plane. According to a preferred embodiment of the invention the carriage supporting the headstock is adjustably mounted on the free end of a column mounted for orbital movement of the headstock in relation to the workpiece.

So that the invention may be easily understood and readily put into effect a preferred embodiment thereof will now be described, reference being had to the accompanying drawings in which:

Fig. 1 is a side view of a grinding machine according to the invention,

Fig. 2 is a plan view of the same,

Fig. 3 is a fragment of the vertical view shown in Fig. 1, the headstock, however, being in operative position, Fig. 4 is a plan view thereof, Fig. 5 is a front view of the upper part of the grinding machine showing one end of the headstock, Fig. 6 is a horizontal cross section on the line VI—VI of Fig. 5, Fig. 7 is a vertical cross section on the line VII—VII of Fig. 1.

The front portion of the frame 1 of the machine supports a table 2 which is adapted to be raised and lowered in the usual manner by means of wheels and also to travel both parallel to and at right angles to the longitudinal direction of the spindles carrying the abrasive members. On the table there are two adjustable centers 3 between which the arbor 4 carrying the work piece or tool to be ground, may be fastened.

The upper front portion of the frame 1 of the machine supports a knee 60, on which a cross slide 61 is arranged, carrying the working table 2 which is adapted to be moved in different directions.

In order to reciprocate the table 2 relative to the frame 1 the following arrangement may be provided: a hand crank 29 actuates a shaft 30, mounted on roller bearings 31 and 32. The outer part of the shaft is provided with threads and cooperates with a threaded bushing 33. This bushing is fixed to the cross slide 61. In turning the hand crank 29 the shaft 30 is rotated and therewith the cross slide and the table 2 are reciprocated relative to the frame 1 since the cross slide is in fixed connection with the shaft 30.

In order to raise or lower the table 2 a hand lever 34 is operated. This lever is connected to a spindle 36 (only the center line of the axis is shown in the drawing), at the inner end of which a bevel gear 37 is mounted, meshing with another bevel gear 38, fixed at the end of a vertical screw spindle 39, swivelling in a roller bearing 40. The screw spindle turns in a threaded bushing 41 which may be part of frame 1. Depending on the direction of turning of the hand lever 34 the whole working table 2 is raised or lowered relative to the frame 1.

At the back of the frame 1 there is a horizontally rotatable column 5 provided at its upper end with a guide 6 on which is mounted a slidable carriage 7. The adjustment of the carriage to and from the work is effected by means of a hand lever 8. On the upper surface of the carriage 7 is a horizontally rotatable headstock 9 in which are mounted two driven spindles. The one 10 of the spindles passes through the headstock 9 in the longitudinal direction of the latter and carries at its free end an abrasive member 11 and is driven by an electro-motor 12 mounted on the headstock. The other spindle 13 may be mounted perpendicularly to spindle 10 in a nose or spindle head 14 provided at the end of the headstock 9 opposite to the abrasive member 11, the nose 14 being rotatable and adjustable in a vertical plane so that the spindle 13 may be set in different positions forming angles with the horizontal plane. The spindle 13 is driven by the same electro-motor 12 as spindle 10 and rotatable movement is transmitted to spindle 13 via spindle 10 or an extension thereon. On each free end of the spindle 13 is mounted an abrasive member 15, 16. The adjustment of the nose 14, which may be secured into desired position by means of a screw 17, may be read on a scale 18. Also the position of the headstock 9 relative to the carriage 7 may be read on a scale 19 and secured into position by means of screws 20. The column 5 may be secured into position after adjustment by means of a screw 21; and the relative position of the column may be read on a scale 22.

Fig. 6 shows more particularly how screws 17 may secure nose 14 in desired position. If the nose or spindle head 14 together with the spindle 13 and the abrasive members 15, 16 is to be adjusted in a vertical plane in order to form an angle with the horizontal plane, the screws or distance sink bolts 17 are loosened and the head 14 turned into the desired position. By this operation the bolts 17 are caused to slide with their heads 54 in a circular track or groove 53, arranged in the head 14. When the desired position is reached, the bolts 17 are tightened and the heads 54 abut against the outer face of the groove 53.

If the carriage 7 together with the head stock 9 is to be reciprocated relative to the work on the table 2, a lever 8 (Figs. 3 and 5) is operated in the direction shown by arrows in Fig. 3. By this operation a spindle 55 (Fig. 7) is turned, on which spindle a worm gear segment 56 is mounted. This segment engages a gear rack 57 arranged underneath and fixed to the carriage 7. During this movement the screws or distance sink-bolts 20 hold the carriage 7 and headstock 9 together.

If the headstock 9 is to be turned relative to the carriage 7, the screws 20 on both sides of the carriage 7 are loosened and the desired position of the carriage and the head stock is arranged. During this movement the heads 59 of the screws 20 slide in a circular track or groove 58, arranged in the carriage 7. When the desired position is reached, the bolts 20 are tightened again and keep carriage and headstock in position.

The work illustrated consists of a formed cutter with side cutters 23, angular cutters 24, 25 and end cutters 26, 27. By means of an apparatus 28 (Fig. 2) rotation of the arbor 4 and of the cutting tool mounted thereon may be effected one tooth or the like at a time.

As shown in Figs. 1 and 2 the side cutters 23 (Fig. 4) are ground by the abrasive member 11. In order that the cutter may have adequate clearance it is turned in such a manner that the edge of the tooth is somewhat below the horizontal plane extending through the centre of the arbor 4. When grinding, the table 2 is moved horizontally and at right angles to the spindle 10 so that the work will pass before the rotating abrasive member 10. By the movement of the table 2 towards the abrasive member 11 the diameter of the work may be adjusted. The grinding of the angular cutters 24, 25 will be apparent from Figs. 5 and 6 respectively. The headstock 9 is operated and the column 5 is adjusted to an angle corresponding to that of the cutter whereafter the nose 14 of the spindle is turned in such a manner that the spindle 13 carrying the abrasive members 15, 16 assumes an angular position corresponding to the clearance of the cutter. By means of the hand lever 8 the headstock 9 is moved to and fro in the direction indicated by the arrows in Figs. 3, 5 and 6, the abrasive member 16 thereby passing the cutter 24 or the disk 15 passing the cutter 25. The feeding is effected by moving the table in one of the directions indicated by the double headed arrow in Fig. 2. The grinding of the end cutters 26, 27 is carried out in a similar manner, a detailed description thereof thus being superfluous.

It will be apparent from the above that cutting tools of all sorts may be ground without having to be re-set or recentered a single time during the whole course of a grinding operation.

What I claim and desire to secure by Letters Patent is:

1. In a grinding machine for grinding cutting tools, especially formed cutters, the combination of a working table on which the tool to be ground may be fixed, a separate column mounted for rotary movement around a vertical axis arranged excentrically to the longitudinal axis of the column, a carriage on said column slidable in a horizontal plane, a head stock mounted for rotary movement on said carriage and carrying two driven spindles with an abrader secured to the free end of each, the axis of one of said spindles being perpendicular to the axis of the other spindle and being mounted for adjustment to various inclines in a vertical plane.

2. In a grinding machine for grinding cutting tools, especially formed cutters, the combination of a working table on which the tool to be ground may be fixed, a separate column mounted for rotary movement around a vertical axis arranged between the longitudinal axis of the column and the working table, a carriage on said column slidable in a horizontal plane, a head stock mounted for rotary movement on said carriage and carrying two driven spindles with an abrader secured to the free end of each, the axis of one of said spindles being perpendicular to the axis of the other spindle and being mounted for adjustment to various inclines in a vertical plane.

3. In a grinding machine for grinding cutting tools, especially formed cutters, the combination of a working table on which the tool to be ground may be fixed, a separate column mounted for rotary movement around a vertical axis, a carriage slidable on said column in a horizontal plane, a head stock mounted for rotary movement on said carriage and carrying two driven spindles with an abrader secured to the free end of each, the axis of one of said spindles being perpendicular to the axis of the other spindle and being mounted for adjustment to various inclines in a vertical plane.

4. In a grinding machine for grinding cutting tools, especially formed cutters, the combination of a working table on which the tool to be ground may be fixed, a separate column mounted for rotary movement around a vertical axis, a carriage slidable on said column in a horizontal plane, a head stock mounted for rotary movement on said carriage, two driven spindles, one of said spindles being mounted in said head stock and having its free end provided with an abrader, a nose mounted for rotary movement on said head stock, the other of said spindles being mounted in said nose perpendicular to the axis of said first spindle so that said second spindle having an abrader at each end may be adjusted at various inclines in a vertical plane.

ELIAS NAPOLEON EKLUND.

REFERENCES CITED

The following references are of record in the file of this patent:

UNITED STATES PATENTS

| Number | Name | Date |
| --- | --- | --- |
| 1,027,558 | Meyers | May 28, 1912 |
| 1,326,423 | Rennie | Dec. 30, 1919 |
| 2,182,231 | Le Blond | Dec. 5, 1939 |

FOREIGN PATENTS

| Number | Country | Date |
| --- | --- | --- |
| 111,395 | Great Britain | Nov. 29, 1917 |
| 355,707 | Germany | June 30, 1922 |
| 594,352 | Germany | Mar. 15, 1934 |